(12) United States Patent
Kakei et al.

(10) Patent No.: US 7,717,621 B2
(45) Date of Patent: May 18, 2010

(54) LINEAR MOTION GUIDE SYSTEM WITH HIGHLY-TIGHT SEALING UNITS

(75) Inventors: Shigeki Kakei, Mino (JP); Takashi Yatsu, Kamakura (JP); Hideaki Ogura, Kamakura (JP)

(73) Assignee: Nippon Thompson Co., Ltd., Tokyo (JP)

( * ) Notice: Subject to any disclaimer, the term of this patent is extended or adjusted under 35 U.S.C. 154(b) by 407 days.

(21) Appl. No.: 11/723,813

(22) Filed: Mar. 22, 2007

(65) Prior Publication Data
US 2007/0223845 A1 Sep. 27, 2007

(30) Foreign Application Priority Data
Mar. 22, 2006 (JP) ............................. 2006-078719

(51) Int. Cl.
F16C 29/06 (2006.01)
F16C 33/10 (2006.01)
F16C 33/72 (2006.01)

(52) U.S. Cl. .............................. 384/15; 384/13; 384/45

(58) Field of Classification Search ............. 384/13–16, 384/43–45, 49, 51; 277/38, 95, 396, 377, 277/412
See application file for complete search history.

(56) References Cited

U.S. PATENT DOCUMENTS

| | | | | | |
|---|---|---|---|---|---|
| 5,451,109 | A | * | 9/1995 | Ichida ........................ | 384/15 |
| 5,492,413 | A | * | 2/1996 | Tsukada ..................... | 384/15 |
| 5,634,722 | A | | 6/1997 | Yuasa et al. | |
| 5,678,927 | A | * | 10/1997 | Yabe et al. ................. | 384/13 |
| 5,769,543 | A | * | 6/1998 | Tsukada et al. ............ | 384/15 |
| 5,775,813 | A | * | 7/1998 | Saitoh ........................ | 384/15 |
| 5,871,282 | A | * | 2/1999 | Yuasa ......................... | 384/15 |
| 6,082,899 | A | * | 7/2000 | Suzuki et al. .............. | 384/13 |
| 6,106,154 | A | * | 8/2000 | Agari ......................... | 384/15 |
| 6,135,638 | A | * | 10/2000 | Agari ......................... | 384/13 |
| 6,155,717 | A | * | 12/2000 | Michioka et al. .......... | 384/15 |
| 6,250,805 | B1 | * | 6/2001 | Kuwahara .................. | 384/15 |
| 6,461,045 | B1 | * | 10/2002 | Kamimura et al. ........ | 384/13 |
| 6,517,244 | B2 | * | 2/2003 | Ishihara ...................... | 384/13 |

(Continued)

FOREIGN PATENT DOCUMENTS

DE   199 15 042 A1   10/1999

(Continued)

OTHER PUBLICATIONS

European Search Report dated Apr. 17, 2008.

*Primary Examiner*—Marcus Charles
(74) *Attorney, Agent, or Firm*—Browdy and Neimark, PLLC

(57) ABSTRACT

A linear motion guide system is disclosed in which a clearance between a slider and a guide rail is closed truly to clear foreign matter away from entering inside the system through any end of the slider traveling on the guide rail. Thus, the linear motion guide system is befitting to severe working environment where much foreign matter occurs. A highly-tight sealing unit is provided which is comprised of a cassette constituted with a front panel and an enclosure, a sealing plate stowed into the cassette, and a rear panel to close an open edge of the enclosure. The sealing plate is composed of an intermediate spongy medium flanked by skin layers, and lubricant is forcibly absorbed in pores or cells in the intermediate layer.

3 Claims, 5 Drawing Sheets

U.S. PATENT DOCUMENTS

| | | | |
|---|---|---|---|
| 6,520,681 B2 * | 2/2003 | Ishihara | 384/45 |
| 6,705,430 B2 * | 3/2004 | Michioka et al. | 184/5 |
| 6,877,900 B2 * | 4/2005 | Mochizuki et al. | 384/15 |
| 7,374,339 B2 * | 5/2008 | Mochizuki et al. | 384/15 |
| 2002/0141667 A1 * | 10/2002 | Ishihara | 384/45 |
| 2003/0205445 A1 * | 11/2003 | Kuwabara | 198/468.9 |
| 2007/0242906 A1 | 10/2007 | Kakei | |

FOREIGN PATENT DOCUMENTS

| | | | |
|---|---|---|---|
| EP | 1 005 953 A2 | 6/2000 | |
| GB | 2 282 420 A | 4/1995 | |
| JP | 9-42284 | 2/1997 | |
| JP | 11-351252 | 12/1999 | |
| JP | 2000-227115 | 8/2000 | |
| JP | 2000-227115 A | 8/2000 | |
| JP | 2001-138342 A | * | 5/2001 |
| JP | 2005-337407 | 12/2005 | |
| JP | 2005-337407 A | 12/2005 | |

* cited by examiner (A)

(B)

LINEAR MOTION GUIDE SYSTEM WITH HIGHLY-TIGHT SEALING UNITS

FIELD OF THE INVENTION

The present invention relates to a linear motion guide system befitting to severe working environment where much foreign matter including chips, debris, dirt, dusts, and so on occurs or any liquid including processing fluids, coolants, and so on splashes. More particularly, it relates to a linear motion guide system with highly-tight sealing units to prevent the foreign matter from invading through forward and aft end caps of a slider that moves on a guide rail.

BACKGROUND OF THE INVENTION

The linear motion guide systems employed in a diversity of machines including machine tools and so on are increasingly used in recent years in a way laying their guide rails bare to the working atmosphere from the view point of increasing spaces to be reserved for processing a workpiece and for installing required equipments, making the guide units themselves compact in construction, cost savings on installations, and so on. Thus, many of modern guide units are customized to have no dustproof means including a telescopic cover, bellows, and so on.

There are known linear motion guide systems with sealing means, which are disclosed in, for example the commonly assigned Japanese Patent Laid-Open No. H9-42284. With the prior linear motion guide system, the sealing means are installed on forward and aft ends of a slider. The sealing means are each comprised of a cassette of U-shape in transverse section, two sheets of seals installed inside the cassette, an intermediate medium held between the seals to feed lubricant, and a scraper plate secured on the outward end of the outside one of the seals. Two sheets of seals are each made U-shaped in transverse section and composed of a metal core and rubber baked on the metal core to provide lips. The interference between the seals is selected at 0.5 mm, which is somewhat larger than usual to make the dust proof performance better.

Nevertheless, the sealing means for the linear motion guide system constructed as stated earlier, because of rubber-made construction, may encounter large frictional resistance and, therefore, lubricant is indispensable to sustain durability of the sealing performance. Thus, the problem faced in the linear motion actuator recited earlier is that the control of lubricant is very tough.

A linear bearing guide system capable of wiping dusts off to keep sealing performance is known in, for example Japanese Patent Laid-Open No. H11-351252. The prior linear bearing guide system has a self-lubricating guide member, which is composed of a lip seal of usual rubber and foamed urethane rubber component secured on the outward surface of a reinforcing plate and impregnated with lubricant. The guide member is protected against lubrication failure to help maintain the durability against frictional resistance.

The linear bearing guide system constructed as stated earlier, although but befitting to continuous application of lubricant to the lip seal, has a question of lacking in sealing performance.

A dustproof construction in the linear motion guide systems is known in, for example Japanese Patent Laid-Open No. 2000-227115, which is constructed to allow a slider moving in and out along a guide track with less frictional resistance. The prior dustproof construction is comprised of a lubricant reservoir component and a scraper component. The lubricant reservoir component includes three sheets of resilient members made of foamed polyurethane having open cells or pores and impregnated with lubricant, and spacer members of metallic plates each interposed between any two adjacent resilient members to form recesses. The scraper component is mounted on the slider in a way spaced away from the guide track with leaving a slight clearance between them. The foamed polyurethane with open pores is prepared to have physical properties of tensile strength of about 30~50 $kg/cm^3$, percent elongation of about 300~500% and repulsion elasticity of about 30~60%. The foamed polyurethane is impregnated with lubricant of 30~50 weight %.

With the dustproof construction as recited just earlier, nevertheless, the foamed resilient members comes to absorb coolants and so on so that foreign matter such as any liquids builds up gradually in the resilient members. Thus, this poses a problem that the resilient members are insufficient to dislodge the foreign matter from the linear motion guide system.

Another linear guide bearing unit is disclosed in, for example known in, Japanese Patent Laid-Open. No. 2005-337407, which is constructed to keep foreign matter against entering inside the slider to prevent premature wear and breakage. The prior linear guide bearing unit is mounted on forward and aft ends of the slider and composed of the combination of many lubricant applicators, protectors, thin resinous sealing members, side seals of steel plate baked with rubber, and felt sealing members impregnated with grease.

With the linear guide bearing unit having a plurality of sealing members stacked one on the other as stated earlier, however, large axial space would be needed for installation of many sealing members.

SUMMARY OF THE INVENTION

The present invention, therefore, has as its principal object to overcome the problems stated earlier and, in particular, to provide a linear motion guide system with highly-tight sealing units constructed to fit easier over forward and aft ends of slider that fits over or conforms to a guide rail in a sliding manner. More in detail, the highly-tight sealing unit is mainly composed of a sealing plate made of a three-layered sheet material of mechanical froth urethane foam, which has been ordinarily used in packings and shock absorbers. The three-layered sheet material of mechanical froth urethane foam is cut into the sealing plates of desired shape, a suitable number of which is accumulated inside a cassette in a closely juxtaposed relation.

The present invention is concerned with a linear motion guide system, comprising a guide rail made with a lengthwise raceway groove, a slider moving on the guide rail in a sliding manner by virtue of more than one roller, and a highly-tight sealing unit mounted on any one of forward and aft ends of the slider;

wherein the highly-tight sealing unit includes therein at least one sealing plate of three-layer structure that is composed of skin layers of rubbery texture to constitute epidermal layers and an intermediate medium of spongy texture lying between the epidermal layers.

In one aspect of the present invention, there is provided a linear motion guide system in which lubricant is forcibly absorbed into pores in the spongy texture in the sealing plate. Moreover, the sealing plate is composed of mechanical froth urethane foam of low foam ratio, which is formed by frothing mechanically a raw liquid mixed with air.

In another aspect of the present invention, there is provided a linear motion guide system in which the highly-tight sealing unit is comprised of a cassette constituted with a front panel, an enclosure integral with the front panel at any one of edges thereof, the sealing plate stowed into the cassette, and a rear panel to close an open edge of the enclosure.

In another aspect of the present invention, there is provided a linear motion guide system in which the front panel of the cassette has a raised portion reaching the raceway groove on the guide rail and a locating pin planted on the raised portion to locate the sealing plate in a recessed space inside the cassette, while the sealing plate has a raised portion reaching the raceway groove on the guide rail and a locating hole made at the raised portion to fit over the locating pin on the front panel, thereby keeping the raised portion of the sealing plate in positive tight relation against the associated raceway groove on the guide rail.

In a further another aspect of the present invention, there is provided a linear motion guide system in which a lower seal is provided to extend across an overall length of an underneath of the slider inclusive of an underneath of the highly-tight sealing unit to closely seal the slider against the guide rail.

In another aspect of the present invention, there is provided a linear motion guide system in which the slider is comprised of a carriage made thereon with a raceway groove to allow more than one roller to run through there, an end cap secured to any one of forward and aft ends of the carriage and provided therein with a turnaround passage to get the roller turning round in rolling direction, a lubricating plate secured on an outward surface of the end cap to apply lubricant around the roller, and an end seal attached on an outward end of the lubricating plate, and wherein the highly-tight sealing unit is further mounted on an outward surface of the end seal through a spacer.

With the linear motion guide system constructed as stated earlier, the highly-tight sealing unit closes truly any clearance remaining between the slider and the guide rail to keep any foreign contaminant against invading inside the slider through the forward and aft ends of the slider moving on the guide rail, clearing the foreign contaminant away from the guide rail. Thus, the highly-tight sealing unit makes the linear motion guide system befitting to severe working environment where much foreign matter including dust, chips, cutting debris, splashed fluids of cutting fluids, coolants, and so on occurs to adhere to the guide rail. The sealing plate installed in the highly-tight sealing unit is composed of an intermediate spongy medium flanked by skin layers of close-grained texture and fully impregnated with lubricant independently of other sealing plates. Sufficient lubricant held in the spongy medium prevents any processing liquids or coolants adhered on the guide rail from being absorbed into the spongy medium while the sealing plate travels on the guide rail with keeping sling contact with the associated race. The sealing plate wipes the adhered foreign matter including dust, chips debris, and so on off the guide rail while sliding on the guide rail. The sealing plate, as self-lubricated automatically, can slide with continuous smooth relatively to the guide rail. Thus, the highly-tight sealing unit mounted on the slider will not interfere with sliding performance of the slider on the guide rail.

BRIEF DESCRIPTION OF THE DRAWINGS

FIG. 6 is views explanatory of the sealing plate of FIG. 5, in which FIG. 6(A) is a view in side elevation of the sealing plate and FIG. 6(B) is a fragmentary enlarged view of a portion encircled by (B) in FIG. 6(A);

DETAILED DESCRIPTION OF THE PREFERRED EMBODIMENTS

The linear motion guide system according to the present invention will be described later with reference to the accompanying drawings showing a preferred embodiment of the present invention. The linear motion guide system of the present invention is envisaged finding widespread applications in a diversity of machines including machine tools, such as cutting machines, grinding machines and woodcutting machines, which are needed to operate in worse working environment because of the presence of much foreign matter including dust, chips, cutting debris, splashed fluids of cutting fluids, coolants, and so on. To this end, the linear motion guide system of the present invention is provided with highly-tight sealing unit that fit on forward and aft ends of a slider moving on a guide rail, thereby keeping any foreign matter against entering inside the slider through the ends of the slider.

Figure 1:
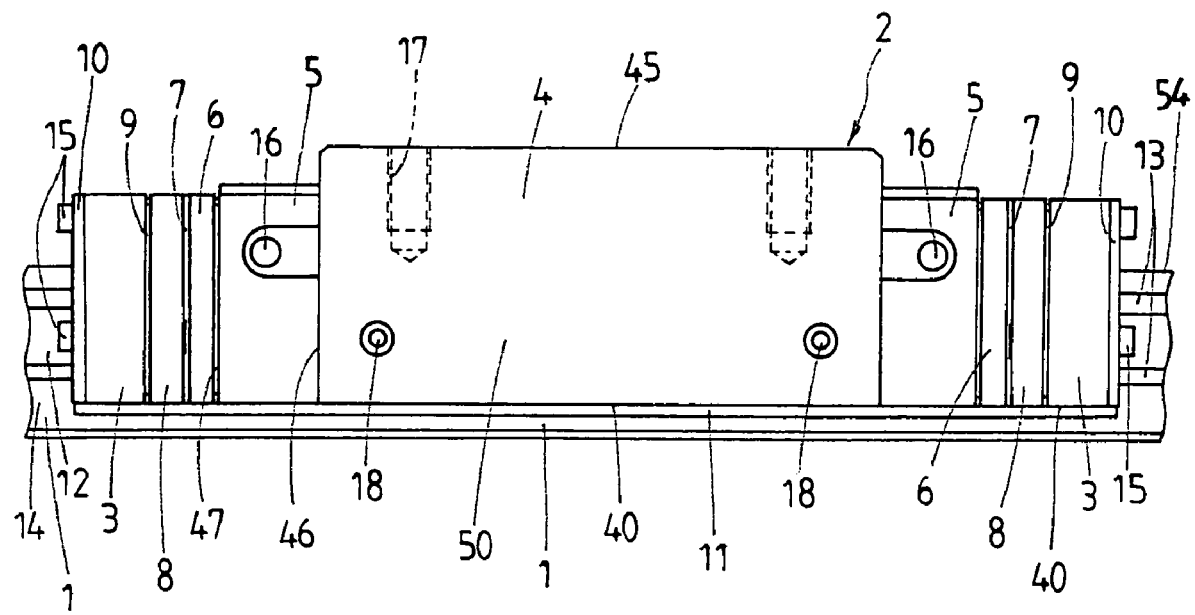
FIG. 1 is a partially cut away view in front elevation of a preferred embodiment of a linear motion guide system with highly-tight sealing units according to the present invention.
Figure 2:
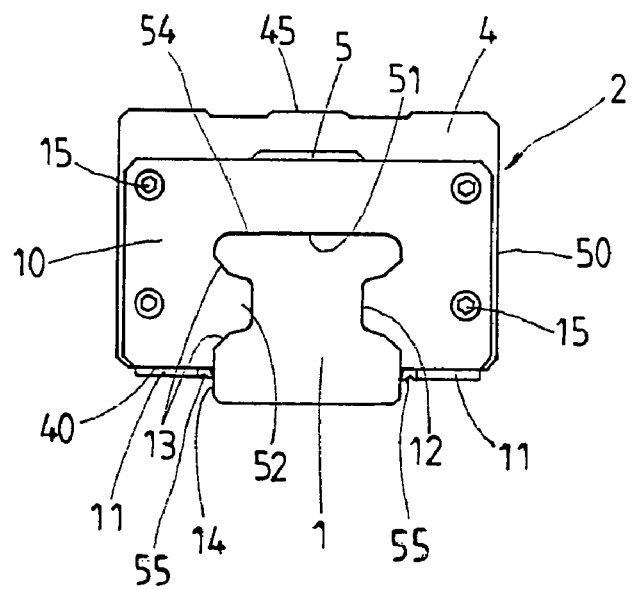
FIG. 2 is a view in side elevation of the linear motion guide system of FIG. 1.
Figure 3:
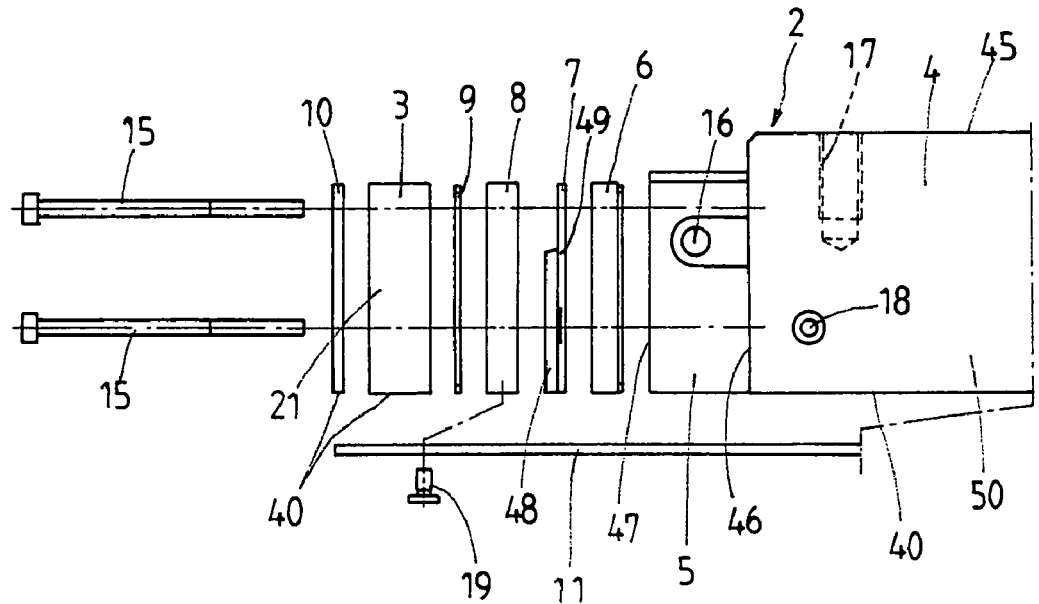
FIG. 3 is an exploded view of the highly-tight sealing unit installed on anyone of forward and aft ends of the linear motion guide system of FIG. 1.
Figure 4:
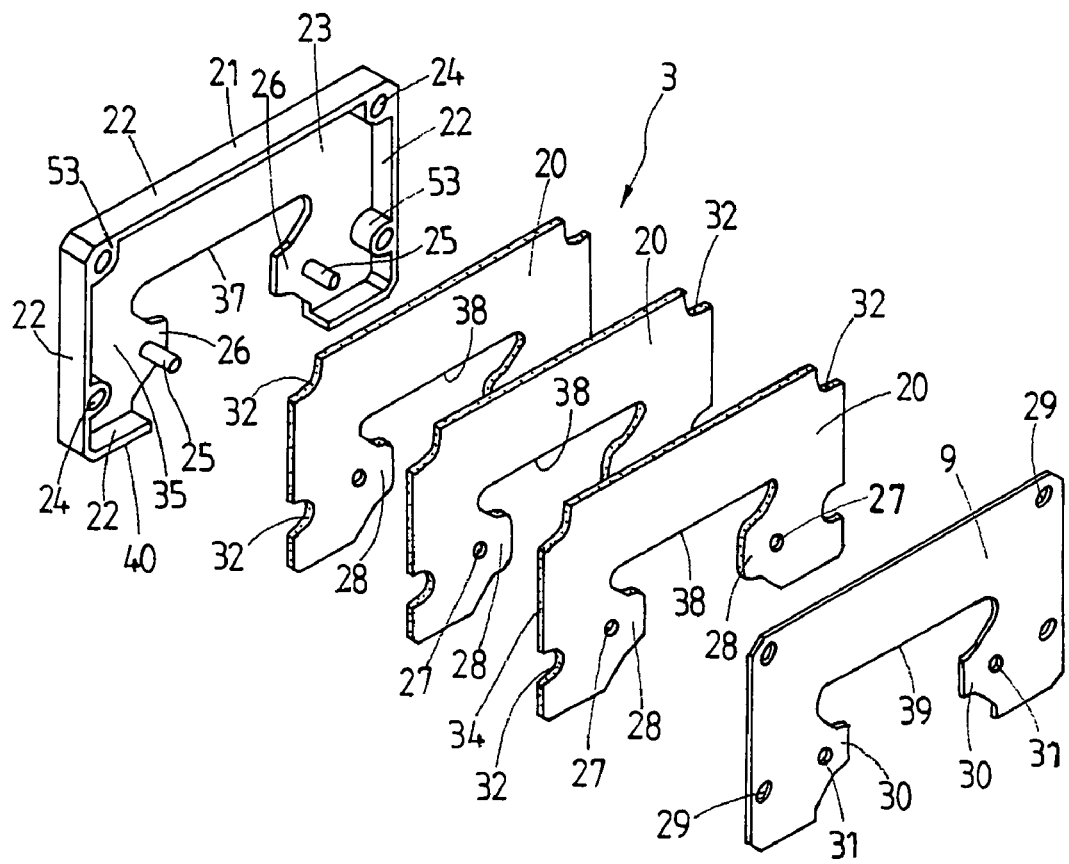
FIG. 4 is an exploded view in perspective of the highly-tight sealing unit to be incorporated into the linear motion guide system of FIG. 1.

Referring now in detail to FIGS. 1 to 3, the linear motion guide of the present invention is comprised of a guide rail 1 having raceway grooves 12 on lengthwise sides 14, and a slider 2 of inverted U-shape in transverse section, which fits over and conform to the guide rail 1. With the embodiment illustrated, the raceway grooves 12 on the guide rail 1 are so made as to provide races 13 befitting to using a roller as rolling element. With the linear motion guide system as stated earlier, the guide rail 1 is made on the raceways 12 thereof with race surfaces 13 to allow more than one roller, not shown, running on there, while the slider 2 is made thereon with raceway grooves, not shown, to provide race surfaces, not shown, lying in opposition to the race surfaces 13 of the guide rail 1. Between the race surfaces 13 on the guide rail 1 and the associated race surfaces on the slider 2, there are defined load races where the rollers run through there to allow the slider 2 to travel smoothly along the guide rail 1 in a sliding manner over a considerable long stroke.

The slider 2 is as shown in FIGS. 1 to 3, is in general comprised of a carriage 4 made thereon with raceway grooves to allow the rollers to run through there, end caps 5 secured to the forward and aft ends 46 of the carriage 4 and provided therein with turnaround passages to get the roller turning round in rolling direction, lubricating plates 6 secured on outward surfaces 47 of the end caps 5 to apply lubricant around the rollers, and end seals 7 attached on outward ends of the lubricating plates 6. Fastening screws 18 fit into widthwise opposite sides 50 of the carriage 4 to fasten retainers to control the rollers. On a top surface 45 of the carriage 4, there are made threaded holes 17 that are used to connect with any counterpart. Moreover, the end caps 5 have threaded holes 16 that are used to fit over a grease nipple, not shown, to feed lubricant to the rollers. The end seals 7 are closely fastened to the associated outward surfaces 47 of the end caps 5 in the norm of working atmosphere. Considering worse atmosphere or environment for the working condition than the norm, alternatively, the lubricating plates 6 for feeding lubricant around the rollers are installed between the end caps 5 and the end seals 7 to make lubrication better as in the embodiment recited here. The lubricating plates 6, especially, are installed to come into sliding contact with at least the races 13 to apply the lubricant onto the races 13. With the linear motion guide system of the present invention, moreover, highly-tight sealing units 3 are provided on the outward surfaces of the end seals 7 through spacers 8, which are made of a metal formed in a cup to fit over lips 48 of the end seals 7. On the outward surfaces of the highly-tight sealing units 3, there are attached scrapers 10 of metal sheet to keep any foreign such as sizeable debris and so on against entering inside the slider 2.

With the linear motion guide system of the present invention, moreover, lower seals 11 are provided to extend across the overall length of the underneath 40 of the slider 2 inclusive of the underneath 40 of the highly-tight sealing units 3 to closely seal the slider against the guide rail 1, making sure of high tightness of the slider 2 and the highly-tight sealing units 3 with respect to the guide rail 1. The lower seals 11 have lengthwise edges 55 that come into close engagement with the associated sides 14 of the guide rail 1, keeping the slider 2 and the highly-tight sealing units 3 well tight with respect to the guide rail 1. In the embodiment illustrated, the lower seals 11 are secured to the spacers 8 with fastening screws 19. The highly-tight sealing units 3 are mounted on the forward and aft ends of the slider 2 to keep the foreign matter including cutting chips, debris, dirt, coolants, processing fluids, and so on away from entering the slider 2 for a long-term service life, irrespective of the working in the worse atmosphere of airborne matter including chips, dirt and dust, splashed coolants, and so on. The highly-tight sealing units 3 include therein many sealing plates 20 to achieve more complete sealing performance. With the embodiment recited here, moreover, scrapers 10 are attached on the outward surfaces of the highly-tight sealing units 3. The scrapers 10 each include a recess 51 adapted to fit over or conform to the guide rail 1 and sidewise opposite ridges 52 reaching the raceway grooves 12 of the guide rail 1.

The linear motion guide unit of the present invention, especially, features the construction of the highly-tight sealing units 3. The highly-tight sealing units 3 are mounted to the forward and aft ends of the slider 2 with fastening screws 15 to fit over the guide rail 1 so as to move together with the slider 2, and composed of a cassette 21 and at least one sealing plate 20 received inside the cassette 21. The highly-tight sealing unit 3 is distinctive by the shape of construction of the sealing plate 20, the arrangement that the highly-tight sealing unit 3 is placed in front of the associated spacer 8, and the construction in itself of the highly-tight sealing unit 3. The highly-tight sealing unit 3 is in general comprised of the cassette 21 constructed with a front panel 23 and an enclosure 22, a plurality of, three in the illustrated version, sealing plates 20 stowed inside the cassette 21, and a rear panel 9 to come into mating or engagement with an open edge of the enclosure 22 to close cassette 21.

Figure 7:
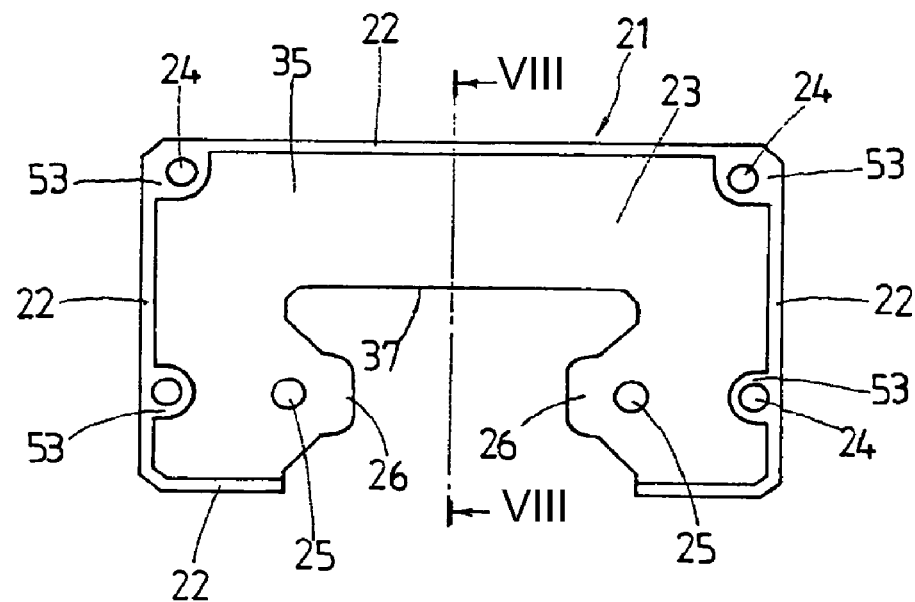
FIG. 7 is a view in rear elevation of a cassette used in the highly-tight sealing unit of FIG. 4.
Figure 8:
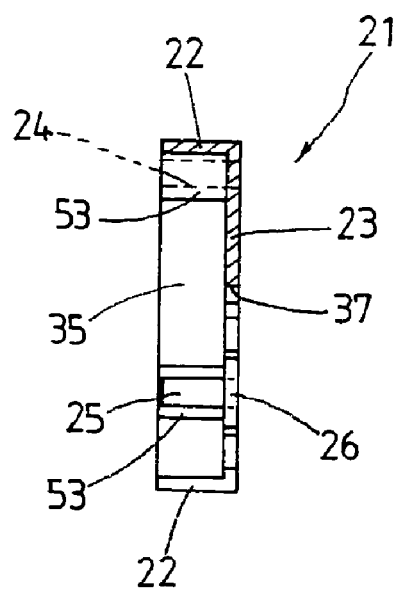
FIG. 8 is a view in transverse section of the cassette, the view being taken on a plane lying on the line VIII of FIG. 7.

With the linear motion guide unit of the present invention, the highly-tight sealing unit 3 of the version illustrated in detail features that the sealing plates 20 are made of a rigid type sheet material of mechanical froth urethane foams, one of which can be commercially available under the registered trademark "ZULEN". The sheet material of mechanical froth urethane foam is made in a three-layered structure and cut into the sealing plates 20 of desired shape, which are then stowed into the cassette 21. At least one sealing plate 20 fits inside the cassette 21. In the embodiment illustrated, three of the sealing plates 20 are kept together in close formation inside the cassette 21. As shown in FIGS. 7 and 8, the cassette 21 is composed of the enclosure 22 formed to provide a recessed space 35 surrounding around the upper edge, bottom edge and widthwise opposing side edges of the sealing plate 20, and the front panel 23 attached to the enclosure 22 to close any one open end or outward end of the enclosure 22 with kept apart from the guide rail 1 with a clearance of not having to touch both the top surface 54 and sides 14 of the guide rail 1. The enclosure 22 is made in dimension to come into close engagement with the sealing plates 20 to make sure of positive interference with the guide rail 1. The cassette 21 has four thickened bosses 53 where fastening holes 24 are made to allow fastening bolts 15 extending through there to clamp the cassette 21 to the outward end of the slider 2. Moreover, the sealing plates 20 are also cut away at 32 to allow the fastening bolts 15 passing through there.

The cassette 21 has sidewise opposing raised portions 26 reaching the associated raceway grooves 12 on the guide rail 1. At the raised portions 26, there are provided locating pins 25 to locate the sealing plates 20 in such a relation that they are kept in close engagement with both the top surface 54 and the sides 14 of the guide rail 1. Correspondingly, the sealing plates 20 are made with locating holes 27 in conformity with the locating pins 25 of the cassette 21. Thus, it will be understood that the sealing function or interference of the sealing plates 20 with the guide rail 1 is to make the close engagement or contact of the raised portions 28 of the sealing plates 20 against the raceway grooves 12 on the guide rail 1. To this end, an interval between widthwise opposed raised portions 28 of the sealing plates 20 is made in dimension less than that between the raceway grooves 12 on the guide rail 1. The cassette 21 is left open in the other side thereof to stow the sealing plates 20 into the recessed space inside the cassette 21. After the installation of three sealing plates 20, the cassette 21 is closed with the closing panel 9. The closing panel 9 serves to keep the sealing plates 20 flat with no warp on the outward surface of the spacer 8 attached on the end of the slider 2. With the highly-tight sealing unit 3 constructed as stated earlier, the cassette 21 is recessed at 37 in the front panel 23 while both the sealing plates 20 and the closing panel 9, as with the front panel 20, are recessed at 38 and 39, respectively to allow the highly-tight sealing unit 3 to fit or conform to the guide rail 1 to move together with the slider 2 along the guide rail 1 in a sliding manner. Moreover, the raised portions 38 and 39 are located in a relation that their inward edges come into close engagement with the ward surfaces of their associated top surface 54 and sides 14 of the guide rail 1.

Figure 6:
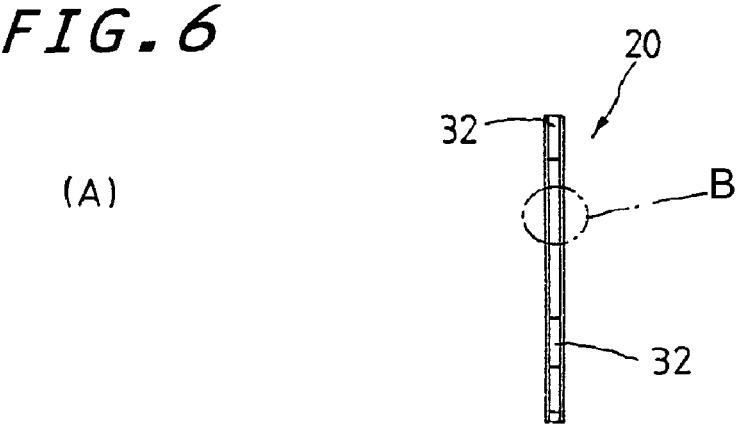
Figure 6:
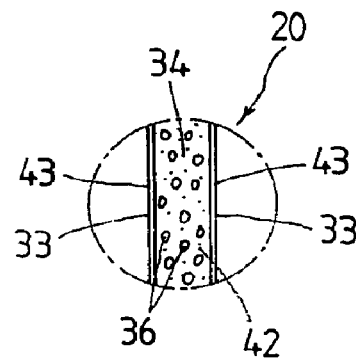
Figure 9:
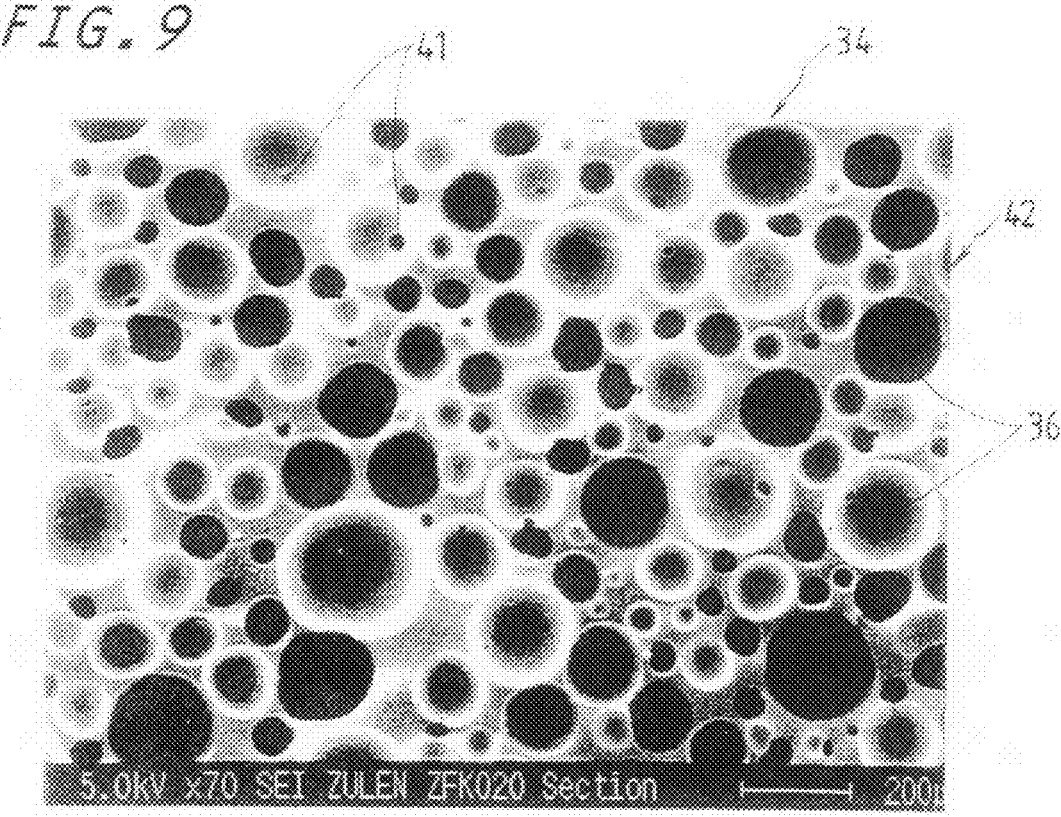
FIG. 9 is an enlarged photo-view in side elevation under microscope to visualize an intermediate medium of the sealing plate shown in FIG. 6(B)
Figure 10:
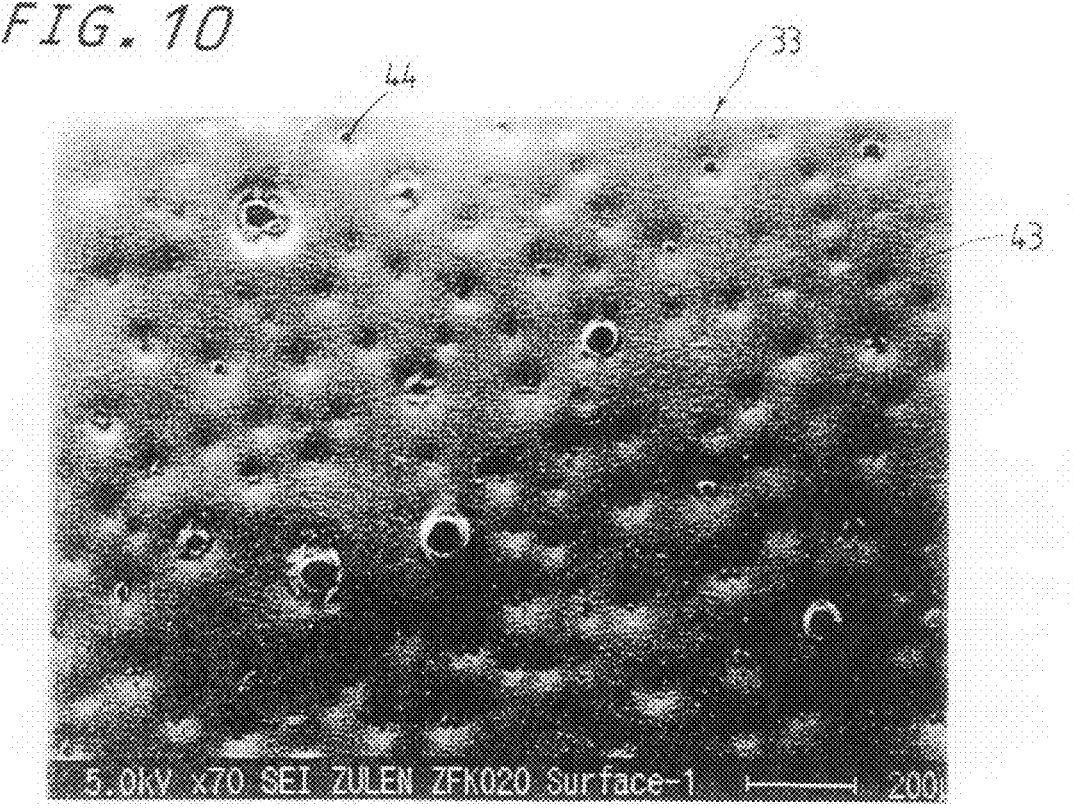
FIG. 10 is an enlarged photo-view in front elevation under microscope to visualize a skin layer of the sealing plate of FIG. 5.

The sealing plates 20 in the version explained here had a thickness of 2.0 mm and were produced of mechanical froth urethane foam selected out of many mechanical froth urethane foams different in mechanical properties, which are on sale with the registered trademark "ZULEN". The selected mechanical froth urethane foam had mechanical properties of density of 0.45 g/cm$^3$, ASKER (C) of 67, elongation percent of 160%, tensile strength of 31.8 kg/cm$^2$, tear strength 8.3 kg/cm, repulsion elasticity of 30% and compressive residual strain of 5.9%. Testing results for a variety of materials different in their properties proved that the mechanical froth urethane foam of the mechanical properties as recited earlier was preferable or better for the sealing plates 20. The mechanical froth urethane foams have been generally used as impact absorbers and sealing members including packing and so on. Of the mechanical froth urethane foams of "ZULEN" different in structure, it was found that the rigid type of those was most preferred for the sealing plates 20 in working performance. In particular, the sealing plate 20 desired for making the frictional resistance of the slider 2 less had mechanical properties of density of 0.45 g/cm$^3$, ASKER (C) of 53, elongation percent of 165%, tensile strength of 20.4 kg/cm$^2$, tear strength 6.2 kg/cm, repulsion elasticity of 35% and compressive residual strain of 5.1%. As an alternative, the sealing plate 20 desired for less frictional resistance of the slider 2 had mechanical properties of density of 0.3 g/cm$^3$, ASKER (C) of 38, elongation percent of 160%, tensile strength of 12.7 kg/cm$^2$, tear strength 3.7 kg/cm, repulsion elasticity of 35% and compressive residual strain of 5.3%. Moreover, the sealing plate 20 may be made in a doubled structure. Unlike the conventional urethane foams, the sealing plates 20 as shown in FIGS. 6, 9 and 10 are made in such structure that their surfaces or skins 33 come into an epidermal layer 43 of close-grained rubbery texture in which most cells or pores are clogged or closed with some pores remaining opened to leave sporadic openings 44 in places, while an intermediate medium 34 is composed of a spongy layer 42. The epidermal layer 43 of rubbery texture is made in a thin film of a matter of some μm. The spongy layer 42 as shown in FIG. 9 has such structure that most cells or pores 36 are made independently of each other and intercommunicated with one another at only parts 41 where the adjacent cells 36 come into contact with each other, forming open-pores or open-cells.

Figure 5:
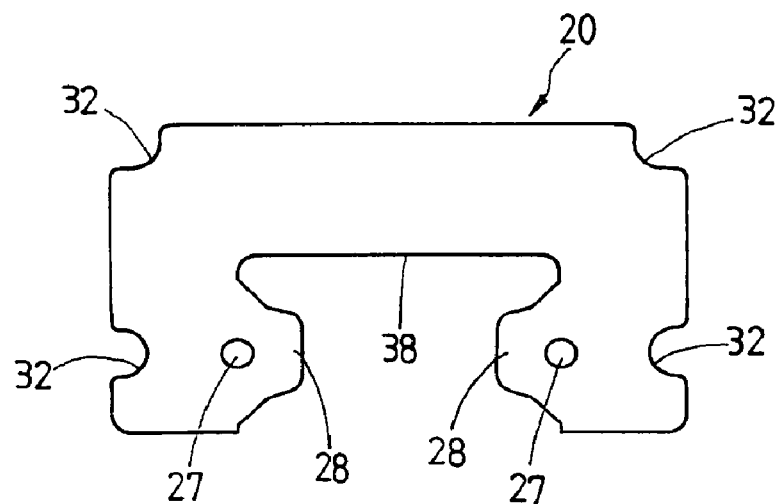
FIG. 5 is a view in front elevation of a sealing plate to be used in the highly-tight sealing unit of FIG. 4.

With the embodiment constructed as stated earlier, the sealing plate 20 is made in a fashion hardly impregnated with lubricating oil or liquids even when bathed intact in them. To fill the sealing plate 20 with the lubricating oil, the sealing plate 20 is first squeezed to collapse, and then released from the squeezed condition after having immersed in the lubricating oil to restore the sealing plate 20 to its original state, thereby getting the pores or cells 36 in the spongy layer 42 forcibly absorbing the lubricating oil to finish the sealing plate 20. As this occurred, the impregnated amount of lubricating oil was a matter of 10~15%. As shown in FIG. 10, the openings 44 caused by bursts of some foams are found sporadically in places in the epidermal layer 43. The skin 33 of the sealing plate 20 is clogged to provide the epidermal layer 43 of rubbery texture, which is an extremely thin film with no foam or bubble. Thus, it in considered that the grain or texture of the epidermal layer 43 forms at mutual contact between the material for the mechanical froth urethane foams and the mold surface in the course of production of the mechanical froth urethane foams. The sealing plates 20 for the highly-tight sealing unit 3 are made by cutting the sheet material of mechanical froth urethane foam into the desired shape as shown in FIG. 5. With the sealing plates 20 produced as stated earlier, the spongy layer 42 interposed between the epidermal layers 43 as shown in FIG. 6 is visually exposed at the overall cut edge around the sealing plate 20 inclusive of the outward and inward peripheries.

The end seal 7 in the linear motion guide unit, as shown in FIGS. 1 and 3, is of the conventional rubber seal in which a metal core 49 is baked thereon with the rubber lip 48. On the other side, the sealing plate 20 in the linear motion guide unit of the present invention, because of rich in elasticity or flexibility to be subject to deflection, has to be stowed or accommodated into the cassette 21 to make sure of the shape retention thereof, keeping the tightness better for a long-lasting service life. The sealing plates 20 constructed in connection with the embodiment as stated earlier has the constructional features as follows.

As contrasted with the sealing plate 20 of the present invention, the end seal 7 of conventional rubber-made seal with lips 48, when designed to make the interference of the seal with the guide rail 1 more, for example a matter of 0.5 mm, to achieve the highly-tight sealing performance, would strongly wipe the lubricant off the guide rail 1, causing lubrication failure that would lead to much wear of the extremities of the lips 48 coming into sliding contact with the guide rail 1. As a result, the greater the frictional resistance that is encountered when the end seal slides over the guide rail 1, the worse the sealing effect that the end seal works on the guide rail 1. On the contrary to the end seal 7 as recited above, with the sealing plate 20 impregnated with the lubricant, the severe squeezing pressure exerted on the sealing plate 20 owing to much interference can be alleviated by function of the spongy 42 of the intermediate medium 34. Moreover, self-lubrication system with lubricant impregnated may be automatic to provide steady and positive application to the guide rail 1, thereby avoiding the lubrication failure. The skin 33 or epidermal layer 43 of close-grained rubbery texture is better to get rid of foreign matter such as dust, debris, and liquid contaminant including coolants, processing liquids, lubricating oils and so on. The epidermal layer 43 in the sealing plate 20 is further better in wear proof and durability.

Second, the sealing plate 20, unlike the materials such as felts, urethane foams and the like, has cells 36 that are dense, fine and uniform in size, but most of which are independently of each other. The cells 3 are filled with sufficient lubricant and therefore cannot absorb liquids such as coolants and the like any further. Since there is less possibility that the lubricant solidifies, the sealing plate 20 may serve functions of sealing and lubrication for a long-term service period. The lubricant content in the sealing plate 20 is about 10~15 volume % that is less than the lubricant content in the conventional felts, urethane foams, but more compared with the lubricant content (about 5 volume %) of the conventional rubber seals containing lubricants in their material. Thus, the sealing plate 20 is considered to be rich in self-lubricating performance.

Third, with the sealing plate 20 of the present invention, the skin 33 is made in the epidermal layer 43 of extremely thin and rubbery texture, which can be bent or deformed to well conform to any complicated contour with experiencing no hardening and no fatigue.

Fourth, the sealing plate 20 is superior in oil proof, resistance to chemicals and wear proof.

What is claimed is:

1. A linear motion guide system, comprising a guide rail made with a lengthwise raceway groove, a slider moving on the guide rail in a sliding manner by virtue of more than one roller, and a highly-tight sealing unit mounted on any one of forward and aft ends of the slider to come into close sliding-contact with lengthwise outward surfaces around the guide rail, making sure of highly sealing effect to keep any foreign matter away from entering inside the slider;

wherein the highly-tight sealing unit is comprised of a cassette constituted with a front panel, at least one sealing plate stowed into the cassette, an enclosure integral with the front panel at any one of edges thereof, and a rear panel to close an open edge of the enclosure, wherein the sealing plate is composed of mechanical froth urethane foam of low foam ratio, which is formed by frothing mechanically a raw liquid mixed with air, wherein the sealing plate is a sheet material of a three-layer structure in itself that is composed of skin layers of rubbery texture to constitute epidermal layers and an intermediate medium of spongy texture lying between the epidermal layers, and lubricant is forcibly absorbed into pores in the spongy texture in the sealing plate, and wherein the front panel of the cassette has a raised portion reaching the raceway groove on the guide rail and a locating pin planted on the raised portion to locate the sealing plate in a recessed space inside the cassette, while the sealing plate has a raised portion reaching the raceway groove on the guide rail and a locating hole made at the raised portion to fit over the locating pin on the front panel, thereby keeping the raised portion of the sealing plate in positive tight relation against the associated raceway groove on the guide rail.

2. A linear motion guide system constructed as defined in claim 1 wherein a lower seal is provided to extend across an overall length of an underneath of the slider inclusive of an underneath of the highly-tight sealing unit to closely seal the slider against the guide rail.

3. A linear motion guide system constructed as defined in claim 1 wherein the slider is comprised of a carriage made thereon with a race to allow more than one roller to run through the race, an end cap secured to any one of forward and aft ends of the carriage and provided therein with a turn-around passage to get the roller turning round in rolling direction, a lubricating plate secured on an outward surface of the end cap to apply lubricant around the roller, and an end seal attached on an outward end of the lubricating plate, and wherein the highly-tight sealing unit is further mounted on an outward surface of the end seal through a spacer.

* * * * *